(12) United States Patent
Aksu et al.

(10) Patent No.: US 11,956,519 B2
(45) Date of Patent: Apr. 9, 2024

(54) METHOD AND APPARATUS FOR SIGNALING GROUPING TYPES IN AN IMAGE CONTAINER FILE

(71) Applicant: Nokia Technologies Oy, Espoo (FI)

(72) Inventors: Emre Aksu, Tampere (FI); Miska Hannuksela, Tampere (FI); Olli Kilpelainen, Tampere (FI); Jonne Juhani Mäkinen, Tampere (FI); Juha-Pekka Hippeläinen, Tampere (FI); Jani Kattelus, Tampere (FI)

(73) Assignee: Nokia Technologies Oy, Espoo (FI)

( * ) Notice: Subject to any disclaimer, the term of this patent is extended or adjusted under 35 U.S.C. 154(b) by 794 days.

(21) Appl. No.: 17/042,498

(22) PCT Filed: Apr. 8, 2019

(86) PCT No.: PCT/FI2019/050286
§ 371 (c)(1),
(2) Date: Sep. 28, 2020

(87) PCT Pub. No.: WO2019/197723
PCT Pub. Date: Oct. 17, 2019

(65) Prior Publication Data
US 2021/0014580 A1    Jan. 14, 2021

Related U.S. Application Data

(60) Provisional application No. 62/656,132, filed on Apr. 11, 2018.

(51) Int. Cl.
*H04N 21/8547* (2011.01)
*G06F 16/41* (2019.01)
(Continued)

(52) U.S. Cl.
CPC ........ *H04N 21/8547* (2013.01); *G06F 16/41* (2019.01); *G06F 16/438* (2019.01); *G11B 27/031* (2013.01)

(58) Field of Classification Search
None
See application file for complete search history.

(56) References Cited

U.S. PATENT DOCUMENTS

| 2015/0193494 A1* | 7/2015 | Malamal Vadakital ..................... H04N 21/85406 707/697 |
| 2016/0105690 A1* | 4/2016 | Denoual ............... H04N 21/236 375/240.02 |
| 2016/0232939 A1* | 8/2016 | Malamal Vadakital ..................... G11B 27/309 |

FOREIGN PATENT DOCUMENTS

WO    2016/193543 A1    12/2016

OTHER PUBLICATIONS

Extended European Search Report received for corresponding European Patent Application No. 19784249.5, dated Nov. 10, 2021, 7 pages.

(Continued)

*Primary Examiner* — Delomia L Gilliard
(74) *Attorney, Agent, or Firm* — Harrington & Smith

(57) ABSTRACT

A method, apparatus and computer program product are provided to signal grouping types in an image container file. Relative to the construction of an image container file, the method, apparatus and computer program product construct an image container file having a group box with a grouping type associated with burst-captured images, time-synchronized images captured by a plurality of image capture devices or an image item associated with an audio track. With respect to the processing of an image container file, the method, apparatus and computer program product permit an (Continued)

image container file having a group box with a grouping type associated with one of burst-captured images, time-synchronized images captured by a plurality of image capture devices or an image item associated with an audio track to be processed to cause one or more image items from the image container file to be rendered in accordance with the grouping type.

17 Claims, 7 Drawing Sheets

(51) Int. Cl.
    *G06F 16/438*     (2019.01)
    *G11B 27/031*     (2006.01)

(56) References Cited

OTHER PUBLICATIONS

Hannuksela et al., "The High Efficiency Image File Format Standard [Standards in a Nutshell]", IEEE Signal Processing Magazine, vol. 32, No. 4, Jul. 2015, pp. 150-156.

"Information technology—High efficiency coding and media delivery in heterogeneous environments—Part 12: Image File Format", ISO/IEC 23008-12, First Edition, Dec. 2017, 82 pages.

"Information technology Coding of audiovisual objects—Part 12: ISO base media file format", ISO/IEC 14496-12, Fifth Edition, Feb. 20, 2015, 254 pages.

International Search Report and Written Opinion received for corresponding Patent Cooperation Treaty Application No. PCT/FI2019/050286, dated Jul. 18, 2019, 16 pages.

* cited by examiner

METHOD AND APPARATUS FOR SIGNALING GROUPING TYPES IN AN IMAGE CONTAINER FILE

RELATED APPLICATION

This application claims priority to PCT Application No. PCT/FI2019/050286, filed on Apr. 8, 2019, which claims priority to U.S. Provisional Application No. 62/656,132, filed on Apr. 11, 2018, each of which is incorporated herein by reference in its entirety.

TECHNOLOGICAL FIELD

An example embodiment relates generally to signaling grouping types in an image container file and, more particularly, to signaling grouping types associated with burst-captured images, time-synchronized images captured by a plurality of image capture devices or an image item associated with an audio track in a group box within an image container file.

BACKGROUND

Image files are frequently created, stored, transmitted and/or rendered for a variety of purposes including video presentation, virtual reality applications or the like. In order to facilitate the use of image files, standards have been developed in order to regulate the construction of image files, thereby facilitating the uniform construction and subsequent processing of such image files.

In this regard, the International Standards Organization (ISO) Base Media File Format (ISOBMFF) defines a general structure for time-based multimedia files including video and audio files. ISOBMFF defines the timing, structure and media information for time sequences of media data. Files conforming to the ISOBMFF include a series of objects, termed boxes.

Building on top of ISOBMFF, a High Efficiency Image File Format (HEIF) standard has been developed by the Moving Picture Experts Group (MPEG) for the storage of images and image sequences. HEIF includes a rich set of features that can be utilized for a wide variety of use cases. Although the features of the HEIF may support a number of use cases, HEIF has not yet been fully developed and implemented to take advantage of the various features supported thereby and, as a result, HEIF cannot currently support or provide the necessary means for interoperability for a unified user experience on different devices for all of the use cases that the rich set of features provided by HEIF would otherwise allow.

BRIEF SUMMARY

A method, apparatus and computer program product are provided in accordance with an example embodiment in order to signal grouping types in an image container file. For example, the method, apparatus and computer program product of an example embodiment construct an image container file having a group box with a grouping type associated with burst-captured images, time-synchronized images captured by a plurality of image capture devices or an image item associated with an audio track. Similarly, the method, apparatus and computer program product of another example embodiment permit an image container file having a group box with a grouping type associated with one of burst-captured images, time-synchronized images captured by a plurality of image capture devices or an image item associated with an audio track to be processed in order to cause one or more image items from the image container file to be rendered in accordance with the grouping type. As such, the method, apparatus and computer program product of an example embodiment define and utilize a grouping type in a group box of an image container file in order to facilitate the storage, transmission and subsequent rendering of burst-captured images, time-synchronized images and/or images associated with audio tracks. Although the method, apparatus and computer program product may be utilized in conjunction with a variety of differently formatted images, the method, apparatus and computer program product of an example embodiment permit the additional features provided by the HEIF to support additional use cases relating to burst-captured images, time-synchronized images and an image item associated with an audio track, thereby increasing the utility of the HEIF.

In one example embodiment, a method is provided that comprises receiving a plurality of image items. Each image item is designated by a respective image identifier. The method also comprises constructing a group box within an image container file. The group box has a grouping type associated with burst-captured images, time-synchronized images captured by a plurality of image capture devices or an image item associated with an audio track. The method further comprises causing storage of respective image identifiers of one or more of the plurality of image items in the group box.

Relative to burst-captured images, the method of an example embodiment receives the plurality of image items by receiving a plurality of image items that were captured in a burst, constructs the group box by constructing the group box to have the grouping type associated with burst-captured images, and causes storage of respective image identifiers by causing storage of the respective image identifiers of the plurality of image items that were captured in a burst in a capture-wise temporal order, such as a capture-wise temporally increasing or decreasing order. With respect to time-synchronized images, the method of an example embodiment receives the plurality of image items by receiving a plurality of image items that were synchronously captured by the plurality of image capture devices, constructs the group box by constructing the group box to have the grouping type associated with time-synchronized images captured by the plurality of image capture devices, and causes storage of respective image identifiers by causing storage of the respective image identifiers of the plurality of image items that were captured by one of the image capture devices in time synchronization with capture of images by one or more other image capture devices. In another embodiment relating to time-synchronized images, the method receives the plurality of image items by receiving a plurality of image items that were synchronously captured by the plurality of image capture devices with the image items captured by a respective image capture device forming a media track having a respective track identifier, constructs the group box by constructing the group box to have the grouping type associated with the media track including the time-synchronized images captured by the respective image capture device, and causes storage of respective image identifiers by causing storage of the respective track identifier of the media track including the time-synchronized images captured by the respective image capture device in time synchronization with capture of images by one or more other image capture devices.

Relative to an image item associated with an audio track, the method of an example embodiment further comprises receiving an audio track associated with a respective image item and designated by a respective track identifier. The method of this example embodiment also constructs the group box by constructing the group box to have the grouping type associated with an image item associated with an audio track, and causes storage of respective image identifiers by causing storage of the respective image identifier of the respective image item and the respective track identifier of the audio track associated with the respective image item.

In another example embodiment, an apparatus is provided that comprises at least one processor and at least one memory including computer program code for one or more programs with the at least one memory and the computer program code configured to, with the at least one processor, cause the apparatus at least to receive a plurality of image items. Each image item is designated by a respective image identifier. The at least one memory and the computer program code are also configured to, with the at least one processor, cause the apparatus to construct a group box within an image container file. The group box has a grouping type associated with burst-captured images, time-synchronized images captured by a plurality of image capture devices or an image item associated with an audio track. The at least one memory and the computer program code are further configured to, with the at least one processor, cause the apparatus to cause storage of respective image identifiers of one or more of the plurality of image items in the group box.

Relative to burst-capture images, the at least one memory and the computer program code are configured to, with the at least one processor, cause the apparatus of an example embodiment to receive the plurality of image items by receiving a plurality of image items that were captured in a burst, to construct the group box by constructing the group box to have the grouping type associated with burst-captured images, and to cause storage of respective image identifiers by causing storage of the respective image identifiers of the plurality of image items that were captured in a burst in a capture-wise temporal order, such as a capture-wise temporally increasing or decreasing order. With respect to time-synchronized images, the at least one memory and the computer program code are configured to, with the at least one processor, cause the apparatus of an example embodiment to receive the plurality of image items by receiving a plurality of image items that were synchronously captured by the plurality of image capture devices, to construct the group box by constructing the group box to have the grouping type associated with time-synchronized images captured by the plurality of image capture devices, and to cause storage of respective image identifiers by causing storage of the respective image identifiers of the plurality of image items that were captured by one of the image capture devices in time synchronization with capture of images by one or more other image capture devices. In another embodiment relating to time-synchronized images, the at least one memory and the computer program code are configured to, with the at least one processor, cause the apparatus to receive the plurality of image items by receiving a plurality of image items that were synchronously captured by the plurality of image capture devices with the image items captured by a respective image capture device forming a media track having a respective track identifier, to construct the group box by constructing the group box to have the grouping type associated with the media track including the time-synchronized images captured by the respective image capture device, and to cause storage of respective image identifiers by causing storage of the respective track identifier of the media track including the time-synchronized images captured by the respective image capture device in time synchronization with capture of images by one or more other image capture devices.

Relative to an image item associated with an audio track, the at least one memory and the computer program code are further configured to, with the at least one processor, cause the apparatus of an example embodiment to receive an audio track associated with a respective image item and designated by a respective track identifier. The at least one memory and the computer program code are configured to, with the at least one processor, cause the apparatus of this example embodiment to construct the group box by constructing the group box to have the grouping type associated with an image item associated with an audio track, and to cause storage of respective image identifiers by causing storage of the respective image identifier of the respective image item and the respective track identifier of the audio track associated with the respective image item.

In a further example embodiment, a computer program product is provided that comprises at least one non-transitory computer-readable storage medium having computer executable program code instructions stored therein with the computer executable program code instructions comprising program code instructions configured, upon execution, to receive a plurality of image items. Each image item is designated by a respective image identifier. The computer executable program code instructions also comprise program code instructions configured, upon execution, to construct a group box within an image container file. The group box has a grouping type associated with burst-captured images, time-synchronized images captured by a plurality of image capture devices or an image item associated with an audio track. The computer executable program code instructions further comprise program code instructions configured, upon execution, to cause storage of respective image identifiers of one or more of the plurality of image items in the group box.

In an embodiment relating to burst-capture images, the program code instructions configured to receive the plurality of image items comprise program code instructions configured to receive a plurality of image items that were captured in a burst, the program code instructions configured to construct the group box comprise program code instructions configured to construct the group box to have the grouping type associated with burst-captured images, and the program code instructions configured to cause storage of respective image identifiers comprise program code instructions configured to cause storage of the respective image identifiers of the plurality of image items that were captured in a burst in a capture-wise temporal order, such as is a capture-wise temporally increasing or decreasing order. In an embodiment relating to time-synchronized images, the program code instructions configured to receive the plurality of image items comprise program code instructions configured to receive a plurality of image items that were synchronously captured by the plurality of image capture devices, the program code instructions configured to construct the group box comprise program code instructions configured to construct the group box to have the grouping type associated with time-synchronized images captured by the plurality of image capture devices, and the program code instructions configured to cause storage of respective image identifiers comprise program code instructions configured to cause storage of the respective image identifiers of the plurality of image items that were captured by one of the image capture devices in time synchronization with capture of images by one or more other image capture devices. In another embodiment relating to time-synchronized images, the program code instructions configured to receive the plurality of image items comprise program code instructions configured to receive a plurality of image items that were synchronously captured by the plurality of image capture devices with the image items captured by a respective image capture device forming a media track having a respective track identifier, the program code instructions configured to construct the group box comprise program code instructions configured to construct the group box to have the grouping type associated with the media track including the time-synchronized images captured by the respective image capture device, and the program code instructions configured to cause storage of respective image identifiers comprise program code instructions configured to cause storage of the respective track identifier of the media track including the time-synchronized images captured by the respective image capture device in time synchronization with capture of images by one or more other image capture devices.

In an embodiment in which an image item is associated with an audio track, the computer executable program code instructions further comprise program code instructions configured to receive an audio track associated with a respective image item and designated by a respective track identifier. In this embodiment, the program code instructions configured to construct the group box comprise program code instructions configured to construct the group box to have the grouping type associated with an image item associated with an audio track, and the program code instructions configured to cause storage of respective image identifiers comprise program code instructions configured to cause storage of the respective image identifier of the respective image item and the respective track identifier of the audio track associated with the respective image item.

In yet another example embodiment, an apparatus is provided that comprises means for receiving a plurality of image items. Each image item is designated by a respective image identifier. The apparatus also comprises means for constructing a group box within an image container file. The group box has a grouping type associated with burst-captured images, time-synchronized images captured by a plurality of image capture devices or an image item associated with an audio track. The apparatus further comprises means for causing storage of respective image identifiers of one or more of the plurality of image items in the group box.

In an embodiment relating to burst-captured images, the means for receiving the plurality of image items comprises means for receiving a plurality of image items that were captured in a burst, the means for constructing the group box comprises means for constructing the group box to have the grouping type associated with burst-captured images, and the means for causing storage of respective image identifiers comprises means for causing storage of the respective image identifiers of the plurality of image items that were captured in a burst in a capture-wise temporal order, such as a capture-wise temporally increasing or decreasing order. In an embodiment relating to time-synchronized images, the means for receiving the plurality of image items comprises means for receiving a plurality of image items that were synchronously captured by the plurality of image capture devices, the means for constructing the group box comprises means for constructing the group box to have the grouping type associated with time-synchronized images captured by the plurality of image capture devices, and the means for causing storage of respective image identifiers comprises means for causing storage of the respective image identifiers of the plurality of image items that were captured by one of the image capture devices in time synchronization with capture of images by one or more other image capture devices. In another embodiment relating to time-synchronized images, the means for receiving the plurality of image items comprises means for receiving a plurality of image items that were synchronously captured by the plurality of image capture devices with the image items captured by a respective image capture device forming a media track having a respective track identifier, the means for constructing the group box comprises means for constructing the group box to have the grouping type associated with the media track including the time-synchronized images captured by the respective image capture device, and the means for causing storage of respective image identifiers comprises means for causing storage of the respective track identifier of the media track including the time-synchronized images captured by the respective image capture device in time synchronization with capture of images by one or more other image capture devices.

In an embodiment in which an image item is associated with an audio track, the apparatus of an example embodiment further comprises means for receiving an audio track associated with a respective image item and designated by a respective track identifier. In this example embodiment, the means for constructing the group box comprises means for constructing the group box to have the grouping type associated with an image item associated with an audio track, and the means for causing storage of respective image identifiers comprises means for causing storage of the respective image identifier of the respective image item and the respective track identifier of the audio track associated with the respective image item.

In an example embodiment, a method is provided that comprises receiving one or more image container files. At least one image container file includes a plurality of image items and one or more group boxes. The method also comprises identifying a grouping type of a group box within a respective image container file. The grouping type is associated with one of burst-captured images, time-synchronized images captured by a plurality of image capture devices or an image item associated with an audio track. The method further comprises identifying respective image identifiers of one or more image items in the group box and causing the one or more image items designated by the respective image identifiers identified in the group box to be rendered in accordance with the grouping type that has been identified.

With respect to burst-captured images, the method of an example embodiment identifies the grouping type of the group box by identifying the grouping type to be associated with burst-captured images, identifies respective image identifiers of one or more image items in the group box by identifying respective image identifiers of a plurality of image items in the group box in a capture-wise temporal order, and causes the one or more image items to be rendered by causing the plurality of image items designated by the respective image identifiers identified in the group box to be rendered as a burst of images in the capture-wise temporal order, such as in a capture-wise temporally increasing or decreasing order. Relative to time-synchronized images, the method of an example embodiment identifies the grouping type of the group box by identifying the grouping type to be associated with time-synchronized images captured by the plurality of image capture devices, identifies respective image identifiers of one or more image items in the group box by identifying respective image identifiers of a plurality of image items in the group box that were captured by one of the image capture devices in time synchronization with capture of images by one or more other image capture devices, and causes the one or more image items to be rendered by causing the plurality of image items that were captured by one of the image capture devices in time synchronization with the capture of images by one or more other image capture devices and that are designated by the respective image identifiers identified in the group box to be rendered. In another embodiment relating to time-synchronized images, the method identifies the grouping type of the group box by identifying the grouping type to be associated with a media track including the time-synchronized images captured by a respective image capture device and having a respective track identifier, identifies respective image identifiers of one or more image items in the group box by identifying the respective track identifier of the media track with which the grouping type is associated, and causes the one or more image items to be rendered by causing the media track designated by the respective track identifier to be rendered so as to cause the plurality of image items that were captured by the respective image capture device to be correspondingly rendered.

With respect to an image item associated with an audio track, the at least one image container file further includes one or more audio tracks. The method of this example embodiment further comprises identifying a respective track identifier of an audio track in the group box. The method of this example embodiment also causes the one or more image items to be rendered by causing the image item designated by the respective image identifier identified in the group box to be rendered and the audio track designated by the respective track identifier identified in the group box to be played back during rendering of the image item.

In another example embodiment, an apparatus is provided comprising at least one processor and at least one memory including computer program code for one or more programs with the at least one memory and the computer program code configured to, with the at least one processor, cause the apparatus at least to receive one or more image container files. At least one image container file includes a plurality of image items and one or more group boxes. The at least one memory and the computer program code are also configured to, with the at least one processor, cause the apparatus to identify a grouping type of a group box within a respective image container file. The grouping type is associated with one of burst-captured images, time-synchronized images captured by a plurality of image capture devices or an image item associated with an audio track. The at least one memory and the computer program code are further configured to, with the at least one processor, cause the apparatus to identify respective image identifiers of one or more image items in the group box and to cause the one or more image items designated by the respective image identifiers identified in the group box to be rendered in accordance with the grouping type that has been identified.

With respect to burst-captured images, the at least one memory and the computer program code are configured to, with the at least one processor, cause the apparatus of an example embodiment to identify the grouping type of the group box by identifying the grouping type to be associated with burst-captured images, to identify respective image identifiers of one or more image items in the group box by identifying respective image identifiers of a plurality of image items in the group box in a capture-wise temporal order, and to cause the one or more image items to be rendered by causing the plurality of image items designated by the respective image identifiers identified in the group box to be rendered as a burst of images in the capture-wise temporal order, such as a capture-wise temporally increasing or decreasing order. Relative to time-synchronized images, the at least one memory and the computer program code are configured to, with the at least one processor, cause the apparatus of an example embodiment to identify the grouping type of the group box by identifying the grouping type to be associated with time-synchronized images captured by the plurality of image capture devices, to identify respective image identifiers of one or more image items in the group box by identifying respective image identifiers of a plurality of image items in the group box that were captured by one of the image capture devices in time synchronization with capture of images by one or more other image capture devices, and to cause the one or more image items to be rendered by causing the plurality of image items that were captured by one of the image capture devices in time synchronization with the capture of images by one or more other image capture devices and that are designated by the respective image identifiers identified in the group box to be rendered. In another embodiment relating to time-synchronized images, the at least one memory and the computer program code are configured to, with the at least one processor, cause the apparatus to identify the grouping type of the group box by identifying the grouping type to be associated with a media track including the time-synchronized images captured by a respective image capture device and having a respective track identifier, to identify respective image identifiers of one or more image items in the group box by identifying the respective track identifier of the media track with which the grouping type is associated, and to cause the one or more image items to be rendered by causing the media track designated by the respective track identifier to be rendered so as to cause the plurality of image items that were captured by the respective image capture device to be correspondingly rendered.

In another embodiment in which the image item is associated with an audio track, the at least one image container file further includes one or more audio tracks. The at least one memory and the computer program code are further configured to, with the at least one processor, cause the apparatus of this example embodiment to identify a respective track identifier of an audio track in the group box, and to cause the one or more image items to be rendered by causing the image item designated by the respective image identifier identified in the group box to be rendered and the audio track designated by the respective track identifier identified in the group box to be played back during rendering of the image item.

In a further example embodiment, a computer program product is provided that comprises at least one non-transitory computer-readable storage medium having computer executable program code instructions stored therein with the computer executable program code instructions comprising program code instructions configured, upon execution, to receive one or more image container files. At least one image container file includes a plurality of image items and one or more group boxes. The computer executable program code instructions also comprise program code instructions configured to identify a grouping type of a group box within a respective image container file. The grouping type is associated with one of burst-captured images, time-synchronized images captured by a plurality of image capture devices or an image item associated with an audio track. The computer executable program code instructions further comprise program code instructions configured to identify respective image identifiers of one or more image items in the group box and to cause the one or more image items designated by the respective image identifiers identified in the group box to be rendered in accordance with the grouping type that has been identified.

In an embodiment relating to burst-captured images, the program code instructions configured to identify the grouping type of the group box comprise program code instructions configured to identify the grouping type to be associated with burst-captured images, the program code instructions configured to identify respective image identifiers of one or more image items in the group box comprise program code instructions configured to identify respective image identifiers of a plurality of image items in the group box in a capture-wise temporal order, and the program code instructions configured to cause the one or more image items to be rendered comprise program code instructions configured to cause the plurality of image items designated by the respective image identifiers identified in the group box to be rendered as a burst of images in the capture-wise temporal order, such as a capture-wise temporally increasing or decreasing order. In an embodiment relating to time-synchronized images, the program code instructions configured to identify the grouping type of the group box comprise program code instructions configured to identify the grouping type to be associated with time-synchronized images captured by the plurality of image capture devices, the program code instructions configured to identify respective image identifiers of one or more image items in the group box comprise program code instructions configured to identify respective image identifiers of a plurality of image items in the group box that were captured by one of the image capture devices in time synchronization with capture of images by one or more other image capture devices, and the program code instructions configured to cause the one or more image items to be rendered comprise program code instructions configured to cause the plurality of image items that were captured by one of the image capture devices in time synchronization with the capture of images by one or more other image capture devices and that are designated by the respective image identifiers identified in the group box to be rendered. In another embodiment relating to time-synchronized images, the program code instructions configured to identify the grouping type of the group box comprise program code instructions configured to identify the grouping type to be associated with a media track including the time-synchronized images captured by a respective image capture device and having a respective track identifier, the program code instructions configured to identify respective image identifiers of one or more image items in the group box comprise program code instructions configured to identify the respective track identifier of the media track with which the grouping type is associated, and the program code instructions configured to cause the one or more image items to be rendered comprise program code instructions configured to cause the media track designated by the respective track identifier to be rendered so as to cause the plurality of image items that were captured by the respective image capture device to be correspondingly rendered.

In an embodiment in which an image item is associated with an audio track, the at least one image container file further includes one or more audio tracks. The computer executable program code instructions of this example embodiment further comprise program code instructions configured to identify a respective track identifier of an audio track in the group box. In this embodiment, the program code instructions configured to cause the one or more image items to be rendered comprise program code instructions configured to cause the image item designated by the respective image identifier identified in the group box to be rendered and the audio track designated by the respective track identifier identified in the group box to be played back during rendering of the image item.

In yet another example embodiment, an apparatus is provided that comprises means for receiving one or more image container files. At least one image container file includes a plurality of image items and one or more group boxes. The apparatus also comprises means for identifying a grouping type of a group box within a respective image container file. The grouping type is associated with one of burst-captured images, time-synchronized images captured by a plurality of image capture devices or an image item associated with an audio track. The apparatus further comprises means for identifying respective image identifiers of one or more image items in the group box and causing the one or more image items designated by the respective image identifiers identified in the group box to be rendered in accordance with the grouping type that has been identified.

In an embodiment relating to burst-captured images, the means for identifying the grouping type of the group box comprise means for identifying the grouping type to be associated with burst-captured images, the means for identifying respective image identifiers of one or more image items in the group box comprise means for identifying respective image identifiers of a plurality of image items in the group box in a capture-wise temporal order, and the means for causing the one or more image items to be rendered comprises means for causing the plurality of image items designated by the respective image identifiers identified in the group box to be rendered as a burst of images in the capture-wise temporal order, such as in a capture-wise temporally increasing or decreasing order. In an embodiment relating to time-synchronized images, the means for identifying the grouping type of the group box comprises means for identifying the grouping type to be associated with time-synchronized images captured by the plurality of image capture devices, the means for identifying respective image identifiers of one or more image items in the group box comprises means for identifying respective image identifiers of a plurality of image items in the group box that were captured by one of the image capture devices in time synchronization with capture of images by one or more other image capture devices, and the means for causing the one or more image items to be rendered comprises means for causing the plurality of image items that were captured by one of the image capture devices in time synchronization with the capture of images by one or more other image capture devices and that are designated by the respective image identifiers identified in the group box to be rendered.

In an embodiment in which an image item is associated with an audio track, the at least one image container file further includes one or more audio tracks. The apparatus of this example embodiment further comprises means for identifying a respective track identifier of an audio track in the group box. In this example embodiment, the means for causing the one or more image items to be rendered comprises means for causing the image item designated by the respective image identifier identified in the group box to be rendered and the audio track designated by the respective track identifier identified in the group box to be played back during rendering of the image item. In another embodiment relating to time-synchronized images, the apparatus includes means for identifying the grouping type of the group box comprises means for identifying the grouping type to be associated with a media track including the time-synchronized images captured by a respective image capture device and having a respective track identifier, means for identifying respective image identifiers of one or more image items in the group box comprises means for identifying the respective track identifier of the media track with which the grouping type is associated, and means for causing the one or more image items to be rendered comprises means for causing the media track designated by the respective track identifier to be rendered so as to cause the plurality of image items that were captured by the respective image capture device to be correspondingly rendered.

BRIEF DESCRIPTION OF THE DRAWINGS

Figure 1:
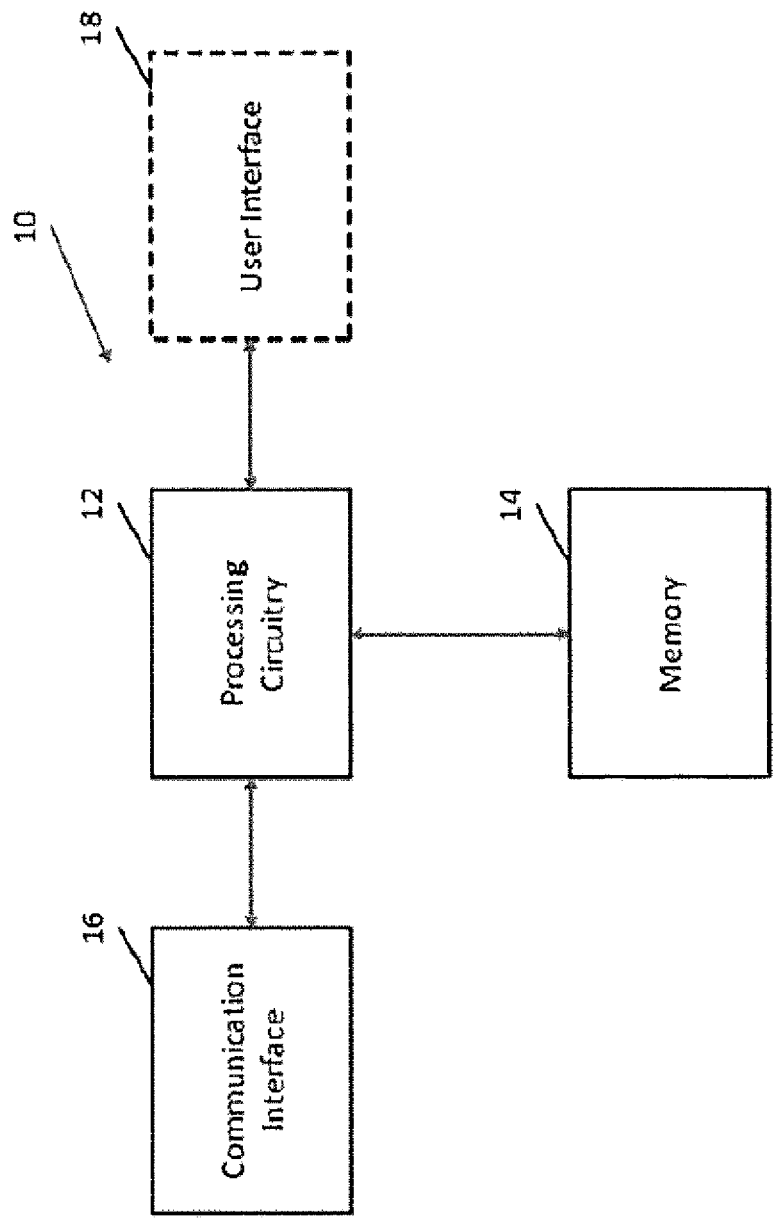
Figure 2:
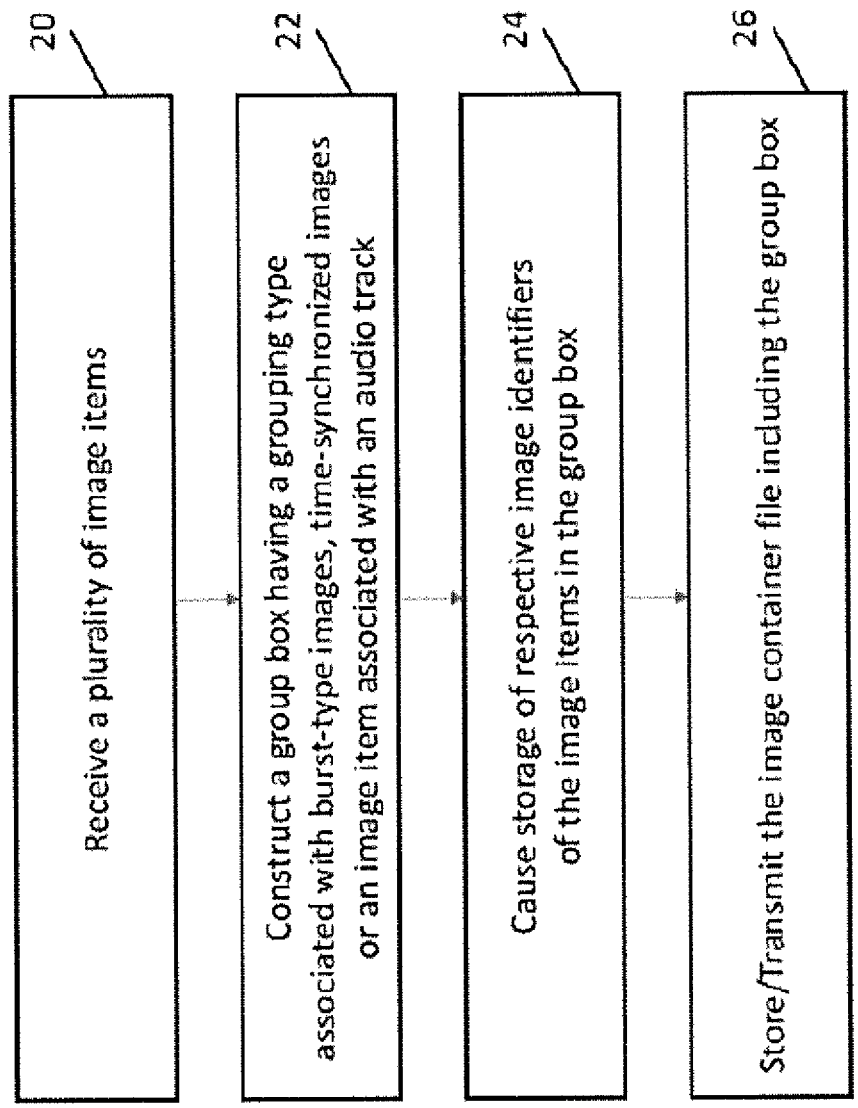
Figure 3:
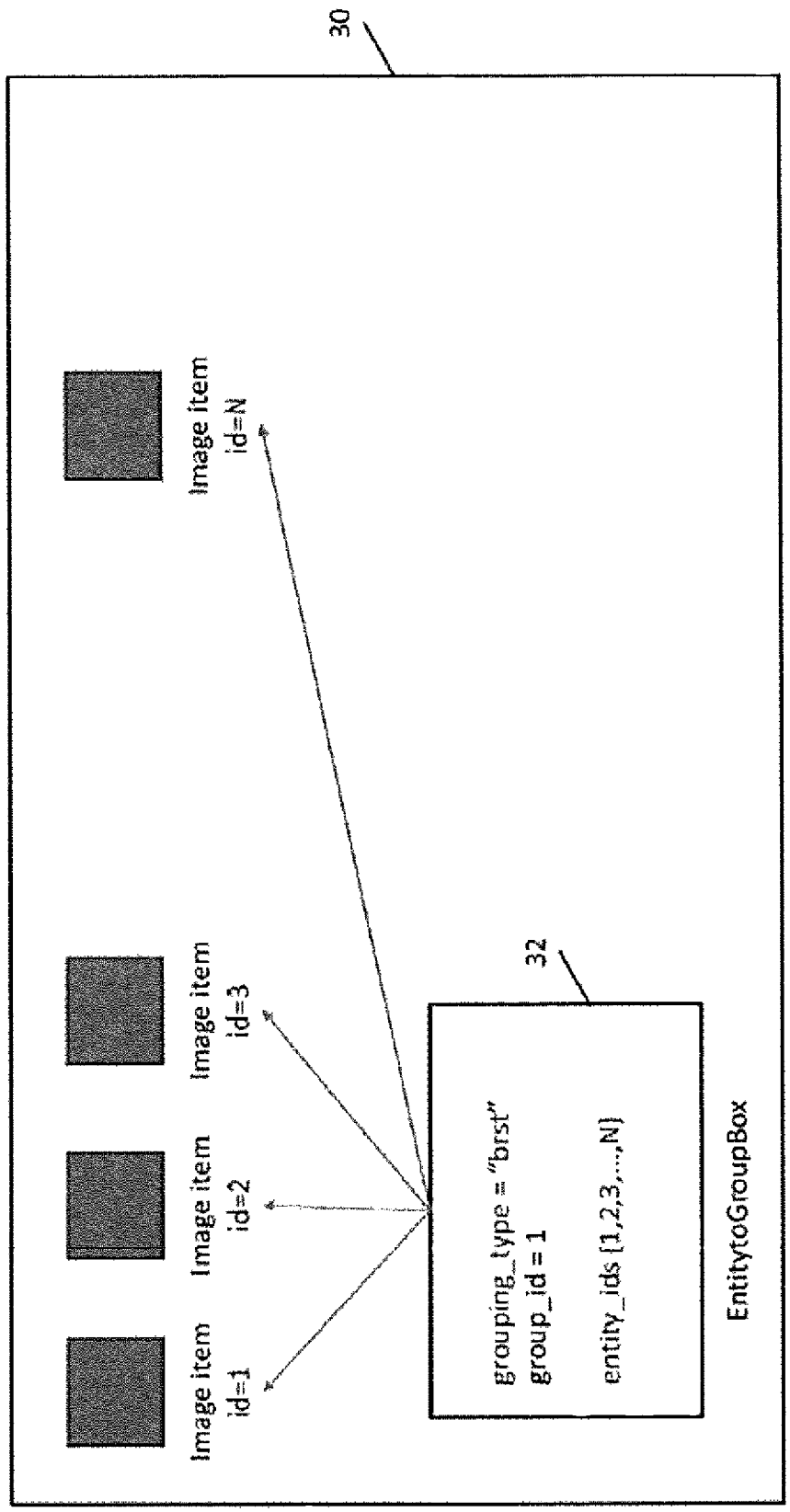
Figure 4:
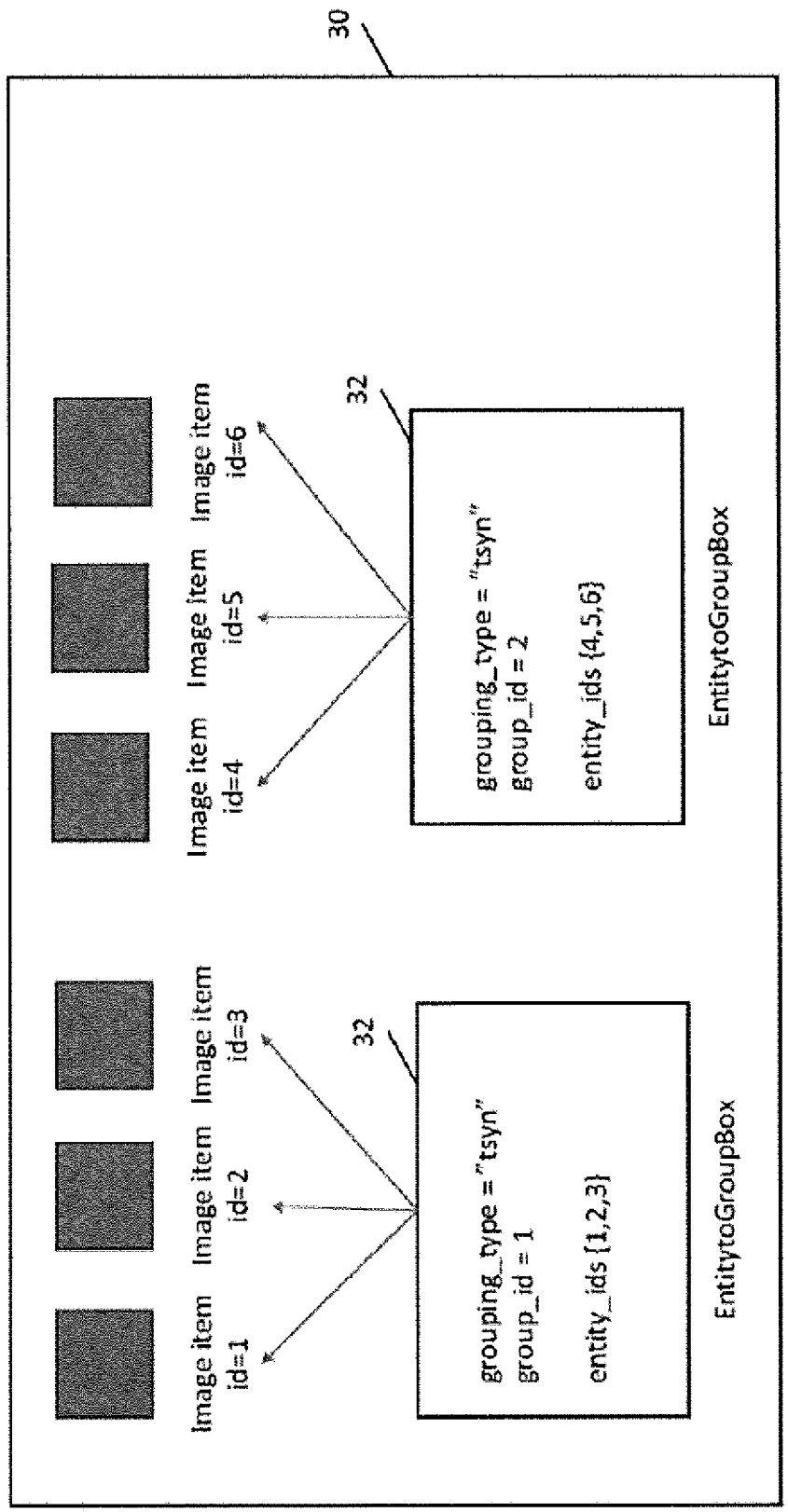
Figure 5:
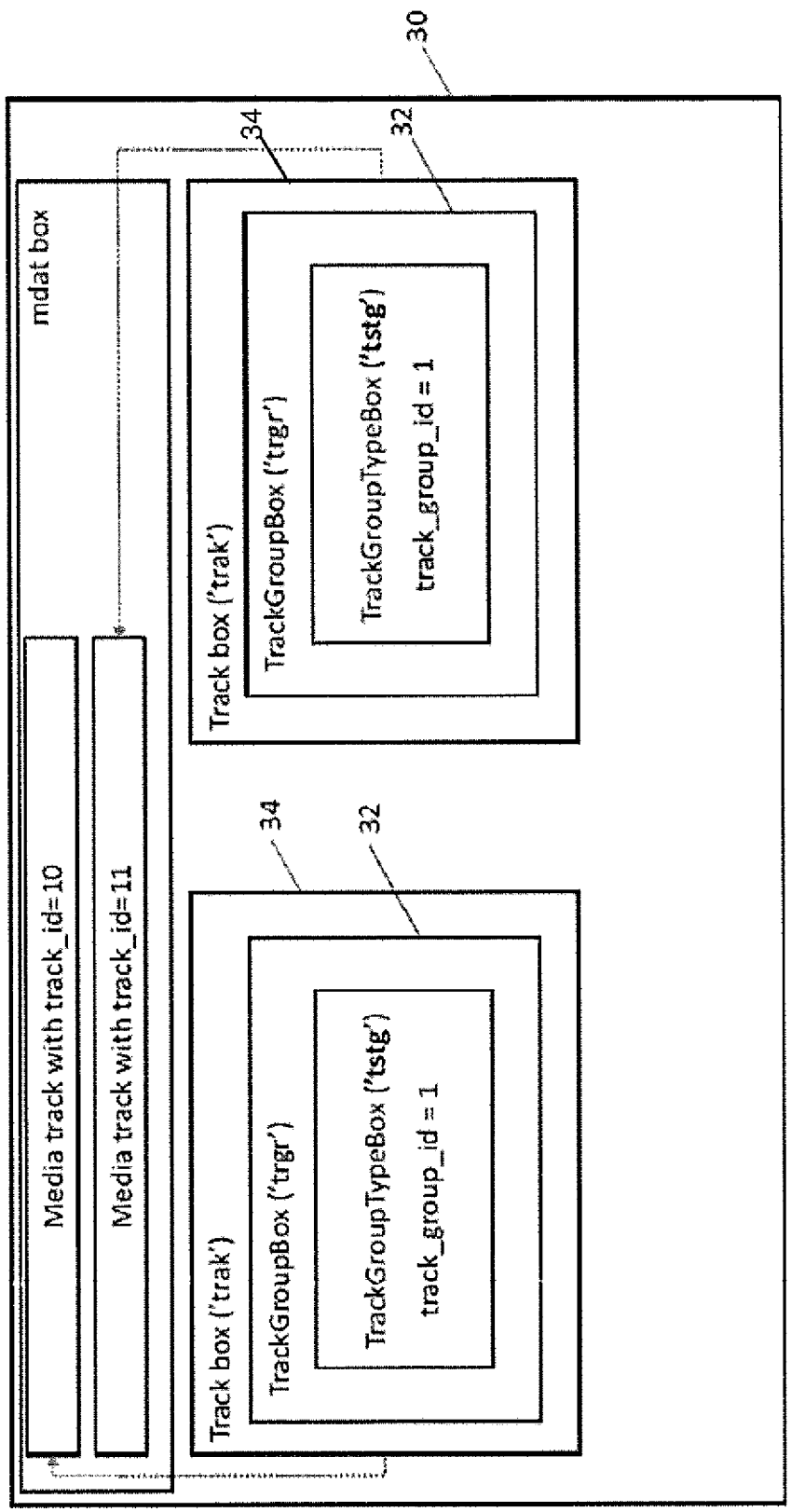
Figure 6:
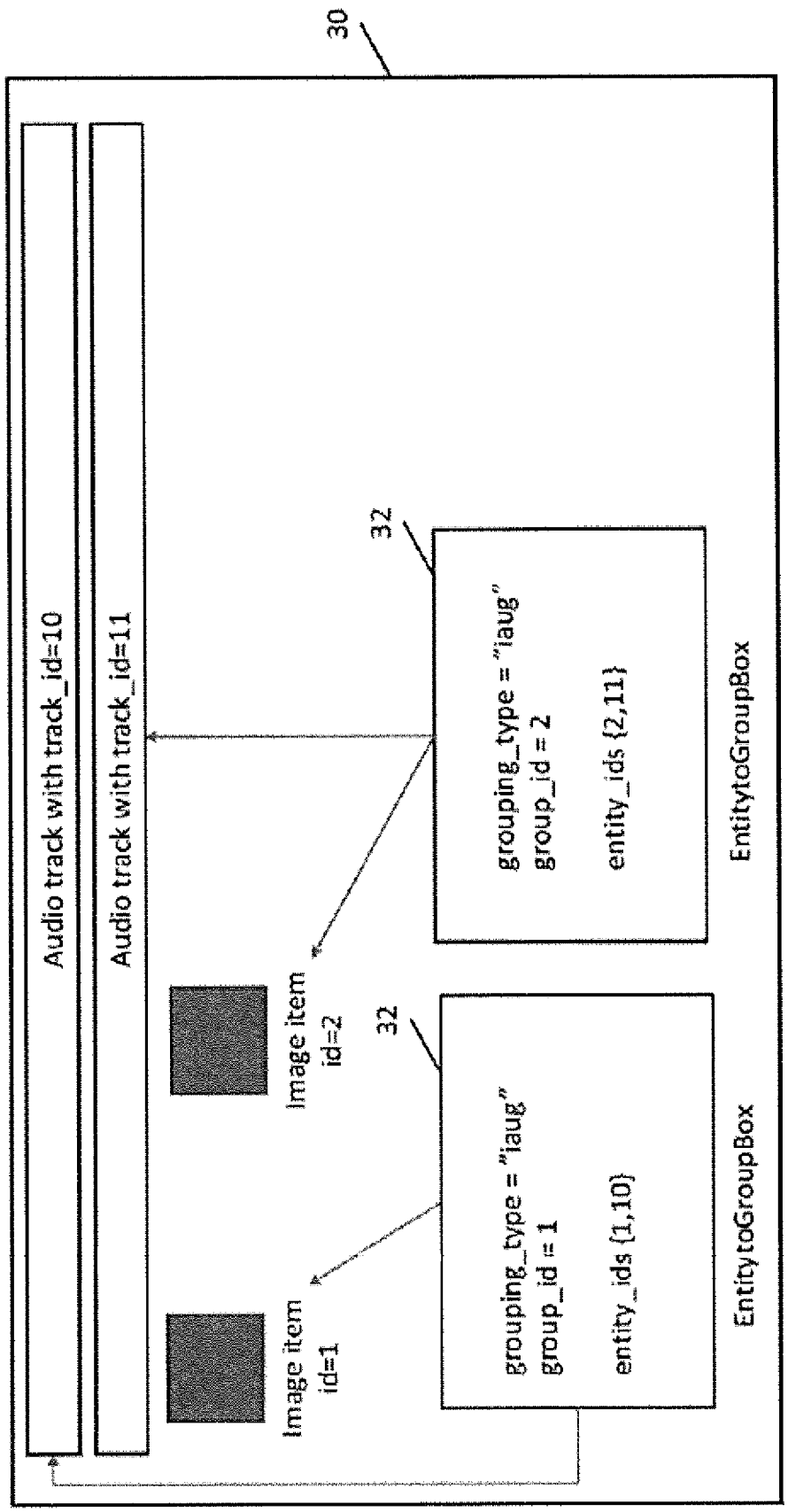
Figure 7:
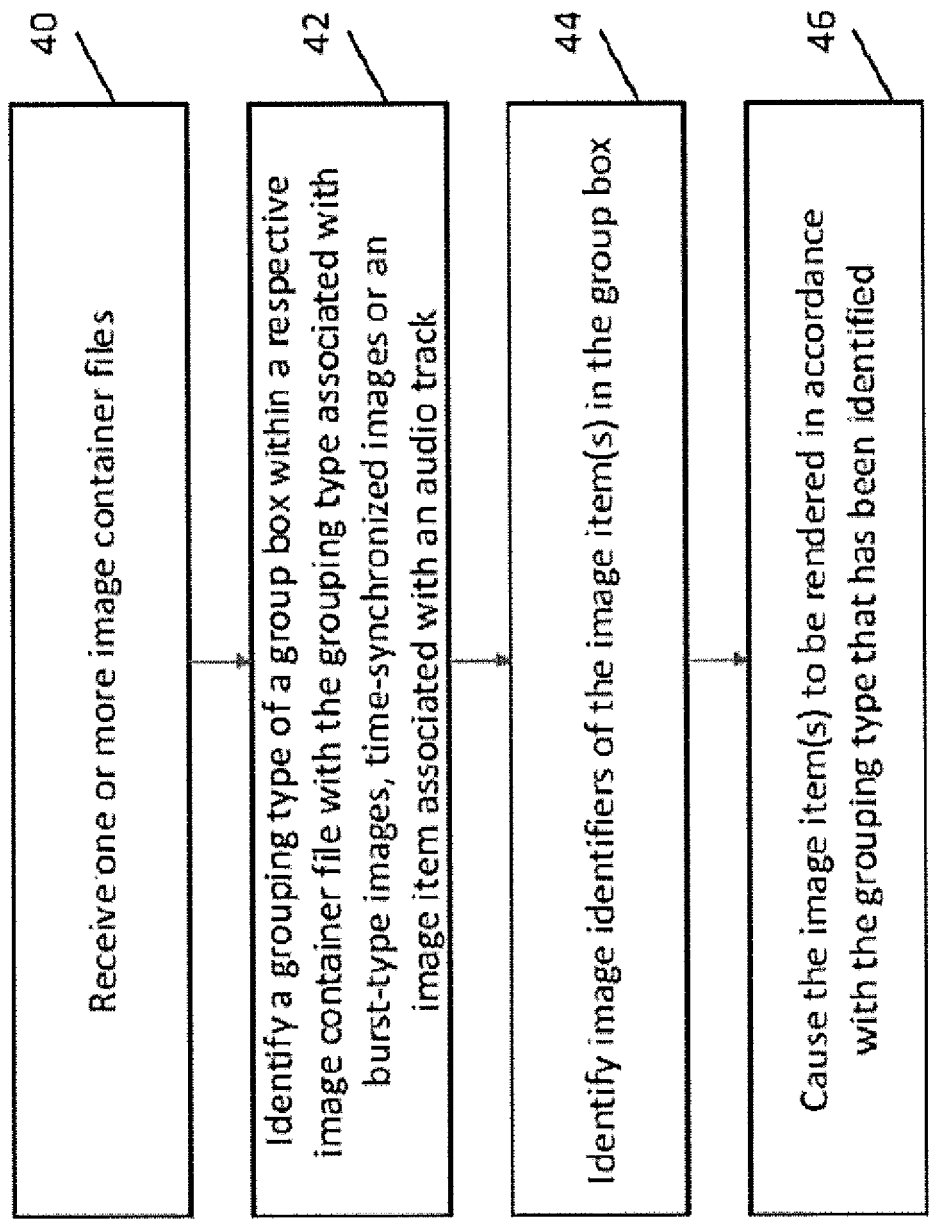

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment of the present disclosure;

FIG. 2 is a flow chart illustrating operations performed, such as by the apparatus of FIG. 1, in order to construct an image container file in accordance with an example embodiment of the present disclosure;

FIG. 3 illustrates an image container file having a group box with a grouping type associated with burst-captured images in accordance with an example embodiment of the present disclosure;

FIG. 4 illustrates an image container file having a group box with a grouping type associated with time-synchronized images captured by a plurality of image capture devices in accordance with an example embodiment of the present disclosure;

FIG. 5 illustrates an image container file including media tracks comprising time-synchronized images captured by a plurality of image capture devices and a group box with a grouping type indicative of the media tracks in accordance with an example embodiment of the present disclosure;

FIG. 6 illustrates an image container file having a group box with a grouping type associated with an image item associated with an audio track in accordance with an example embodiment of the present disclosure; and FIG. 7 is a flow chart illustrating the operations performed, such as by the apparatus of FIG. 1, in order to process an image container file and to cause one or more image items included within the image container file to be rendered in accordance with a grouping type in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to one or more or all of the following: (a) hardware-only circuit implementations (such as implementations in analog circuitry and/or digital circuitry); (b) combinations of circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as a microprocessor(s) or a portion of a microprocessor(s), that requires software (e.g., firmware) for operation, but the software may not be present when needed for operation. This definition of 'circuitry' applies to all uses of this term in this application, including in any claims. As a further example, as used in this application, the term 'circuitry' also covers an implementation of merely a hardware circuit or processor (or multiple processors) or portions of a hardware circuit or processor and its (or their) accompanying software and/or firmware. The term 'circuitry' also covers, for example and if applicable to the particular claim element, a baseband integrated circuit or processor integrated circuit for a mobile phone or a similar integrated circuit in a server, a cellular network device or other computing or network device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment to utilize grouping types associated with burst-captured images, time-synchronized images captured by a plurality of image capture devices or an image item associated with an audio track. As such, an image container file including burst-captured images, time-synchronized images captured by a plurality of image capture devices or an image item associated with an audio track may be constructed so as to include a group box having an appropriate grouping type. Correspondingly, image container files include burst-captured images, time-synchronized images captured by a plurality of image capture devices or an image item associated with an audio track may be efficiently processed in order to permit the image items to be rendered in accordance with the grouping type. Thus, the method, apparatus and computer program product facilitate use cases relating to burst-captured images, time-synchronized images captured by a plurality of image capture devices or an image item associated with an audio track, such as use cases permitted by the features of the high-efficiency image file format (HEIF).

The method, apparatus and computer program product may be utilized in conjunction with a variety of different image files including image files formatted in accordance with a number of different formats including various container file formats. By way of example, but not of limitation, however, the method, apparatus and computer program product will be described below in conjunction with image files formatted in accordance with the ISOBMFF and, more particularly, in conjunction with the HEIF that is built on top of the ISOBMFF for the storage of images and image sequences. H EIF has a rich set of features and, as a result, is feature-wise superior to at least some other image file formats.

With respect to ISOBMFF, an image container file is provided that includes one or more building blocks called box(es). Each box may have a header and a payload. The box header indicates the type of the box and the size of the box, typically in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISOBMFF may be considered to specify a hierarchical structure of boxes. Each box of the ISO base media file may be identified by a four-character code (4CC, fourCC). A four-character code may interchangeably be represented by a 32-bit unsigned integer (by assuming a certain conversion of characters to 8-bit values, a certain bit endianness, and a certain byte endianness). The header may provide information about the type and size of the box.

According to the ISOBMFF, a file may include media data and metadata that may be enclosed in separate boxes. In an example embodiment, the media data may be provided in a media data (mdat) box and the movie (moov) box may be used to enclose the metadata. In some cases, for a file to be operable, both of the mdat and moov boxes must be present. The movie (moov) box may include one or more tracks, and each track may reside in one corresponding track (trak) box. Each track is associated with a handler, identified by a four-character code, specifying the track type. Video, audio, and image sequence tracks can be collectively called media tracks, and they contain an elementary media stream. Other track types comprise hint tracks and timed metadata tracks. Tracks comprise samples, such as audio or video frames. A media track refers to samples (which may also be referred to as media samples) formatted according to a media compression format (and its encapsulation to the ISOBMFF). A hint track refers to hint samples, containing cookbook instructions for constructing packets for transmission over an indicated communication protocol. The cookbook instructions may include guidance for packet header construction and may include packet payload construction. In the packet payload construction, data residing in other tracks or items may be referenced. As such, for example, data residing in other tracks or items may be indicated by a reference as to which piece of data in a particular track or item is instructed to be copied into a packet during the packet construction process. A timed metadata track may refer to samples describing referred media and/or hint samples. For the presentation of one media type, one media track may be selected.

The 'trak' box contains a Sample Table box. The Sample Table box may include, for example, all the time and data indexing of the media samples in a track. Typically, the Sample Table box is required to contain a Sample Description box. The Sample Description box typically also includes an entry count field, specifying the number of sample entries included in the box. In most implementations, the Sample Description box is required to contain at least one sample entry. The sample entry format depends on the handler type for the track. Sample entries give detailed information about the coding type used and any initialization information needed for that coding.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above may be realized.

In some examples, the media samples for the movie fragments may reside in an mdat box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track (and hence are similar to chunks). Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISOBMFF specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

Regardless of the file format of the image file, the apparatus of an example embodiment may be provided by any of a wide variety of computing devices including, for example, an image processor, a video encoder, a video decoder, a mobile terminal, such as a smartphone, a tablet computer, a personal computer, a computer workstation or any other device configured to process an image file. Regardless of the computing device that embodies the apparatus, the apparatus 10 of an example embodiment includes, is associated with or is otherwise in communication with processing circuitry 12, a memory 14, a communication interface 16 and optionally, a user interface 18 as shown in FIG. 1.

The processing circuitry 12 may be in communication with the memory device 14 via a bus for passing information among components of the apparatus 10. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 10 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 12 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 12 may be configured to execute instructions stored in the memory device 14 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 16 may be any means such as a device or circuitry embodied in either hardware or a combination of hardware and software that is configured to receive and/or transmit data, including an image container file, one or more image items, one or more audio tracks or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, such as in instances in which the apparatus 10 is configured to process the image container file and render the one or more image items included within the image container file, the apparatus 10 may optionally include a user interface 18 that may, in turn, be in communication with the processing circuitry 12 to provide output to the user, such as by rendering the image item(s) in the image container file and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device 14, and/or the like).

Referring now to FIG. 2, the operations performed, such as by the apparatus 10 of FIG. 1, in order to construct an image container file including a group box having a grouping type in accordance with an example embodiment are depicted. As referenced herein, the image container file may be an ISOBMFF compliant file and/or an HEIF compliant file. In this regard, an HEIF file may not always be fully ISOBMFF compliant, and an ISOBMFF file may only be partially HEIF compliant. As shown in block 20, the apparatus includes means, such as the processing circuitry 12, the communication interface 16 or the like, for receiving a plurality of image items. Image items may be received from an image capture device, such as a camera, a video recorder, an image sensor or the like. Alternatively, the plurality of image items may have been captured and then stored such that the image items are received from a database or other memory device with which the apparatus is in communication. Still further, the image items may be received via the communication interface following transmission from another device or entity. Each image item may be a respective image captured by an image capture device at a particular instant of time.

Each image item is designated by a respective image identifier. Although various types of image identifiers may be utilized, the image identifiers of an example embodiment described herein are numerical and are sequentially assigned to the image items. Within a respective image container file, the different image items have different image identifiers such that an image identifier uniquely identifies a respective image item within the image container file. However, the image items within different image container files may have the same image identifiers with the image items having the same image identifier being differentiated based upon the image container file that includes the different image items.

Upon receipt of the image items, the apparatus 10 includes means, such as the processing circuitry 12, for constructing an image container file and for including the plurality of image items that are received along with the respective image identifiers of the image item within the image container file. In this regard, an image item's data may be stored in an mdat box, while an image item's metadata, e.g., the definition of the image item, its properties, its relationship to other image items or media tracks or samples, etc., are stored in a meta box ("meta") or "meco" box, as defined in HEIF and ISOBMFF specifications. In an example embodiment, the image container file that is constructed is stored, at least temporarily, by the memory 14. As described below, FIGS. 3-5 illustrate different examples of an image container file 30, each of which includes a plurality of image items designated image item ID=1, image item ID=2 and so on.

As shown in block 22 of FIG. 2, the apparatus 10 also includes means, such as the processing circuitry 12 or the like, for constructing a group box within the image container file. Although the group box may be constructed in various manners depending upon the file format, in an embodiment in which the image container file is constructed in accordance with HEIF, the group box is termed EntitytoGroupBox and is defined to have the following syntax:

```
aligned(8) class EntitytoGroupBox(grouping_type, version, flags)
extends FullBox(grouping_type, version, flags) {
    unsigned int(32) group_id;
    unsigned int(32) num_entities_in_group;
    for(i=0; i<num_entities_in_group; i++)
        unsigned int(32) entity_id;
}
``` with group_id being a non-negative integer assigned to the particular grouping that is not equal to any group_id value of any other EntitytoGroupBox, any item_ID value of the hierarchy level (file, move or track) that contains the GroupListBox, or any track_ID value (when the GroupListBox is contained in the file level); num_entities_in_group specifies the number of entity_id values mapped to this entity group; and entity_id is resolved to an item, when an item with item_ID equal to entity_id is present in the hierarchy level (file, movie or track) that contains the GroupsListBox, or to a track, when a track with track_ID equal to entity_ID is present and the GroupListBox is contained in the file level.

In this example embodiment, the group box has a grouping type associated with one of the following groups: burst-captured images, time-synchronized images captured by a plurality of image capture devices or an image item associated with an audio track, depending upon the type of image items that are included in the image container file. Thus, in an instance in which the image items that are received are burst-captured images, that is, images captured by an image capture device operating in a burst mode, the group box that is constructed within the image container file will have a grouping type associated with burst-captured images. Alternatively, in an instance in which the image items that are received are time-synchronized images captured at the same time by a plurality of image capture devices, the group boxes that are constructed have a grouping type associated with time-synchronized images. In this instance, the time-synchronized images captured by a plurality of image capture devices include one or more image items captured by a first image capture device, one or more image items captured by a second, different image capture device and potentially one or more image items captured by additional image capture devices with the image container file including a plurality of group boxes, one of which is associated with the images captured by each of the different image capture devices. In this regard, the first, second and/or additional image capture devices may be entirely separate devices or may be different image capture modules of a single device, such as the front and back cameras of a mobile terminal. The images are time-synchronized, however in that the images captured by each of the different image capture devices were captured at the same time. Further, in an instance in which an image item that is received is associated with an audio track, the group box that is constructed within the image container file will have a grouping type associated with an image item that is associated with an audio track.

By constructing a group box having one of these different grouping types, burst-captured images, time-synchronized images and an image item associated with an audio track may be uniquely identified and distinguished from one another, thereby permitting efficient processing and subsequent rendering of the image items in accordance with the respective grouping type. For example, burst-captured images may subsequently be efficiently rendered as a burst, time-synchronized images may subsequently be efficiently rendered such that the images captured by a respective image capture device are sequentially presented and an image item associated with an audio track may be presented concurrent with the playback of the audio track.

As shown in block 24, the apparatus 10 of an example embodiment also includes means, such as the processing circuitry 12, the memory 14 or the like, for causing storage of respective image identifiers of one or more of a plurality of image items in the group box. Thus, the group box not only includes the grouping type described above in conjunction with block 22, but also the image identifier(s) of the image item(s) that comprise the respective group. Thus, in an instance in which the image items are burst-captured images, the image identifiers of the burst-captured images are stored in the group box. Similarly, in an instance in which the image items are time-synchronized images captured by a plurality of image capture devices, the image identifiers that designate the time-synchronized images captured by a respective one of the image capture devices are stored in the group box. Further, in an instance in which the image item is associated with an audio track, the image identifier of the image item as well as an identifier of the audio track are stored in the group box. Thus, the group box of the image container file identifies the grouping type as well as the image item(s) from among the image items included within the image container file that constitute the respective group.

As shown in block 26, the apparatus 10 of an example embodiment also includes means, such as the processing circuitry 12, the memory 14 or the like, for storing the image container file including the group box having the grouping type and/or means, such as the processing circuitry, the communication interface 16 or the like, for causing the image container file including the group box having the grouping type, to be transmitted, such as to another device that may store and/or render the image items of the image container file.

In an embodiment in which a plurality of image items are burst-captured images, the apparatus 10, such as the processing circuitry 12, the communication interface 16 or the like, is configured to receive the plurality of image items that were captured in the burst and to then store the image items in an image container file 30, such as shown in FIG. 3. For example, the image container file of FIG. 3 includes a plurality of burst-captured images identified as image item ID=1, image item ID=2, image item ID=3, . . . , image item ID=N. The image container file also includes a group box, such as a group box 32 termed EntitytoGroupBox in the embodiment of FIG. 3. In relation to burst-captured images, the apparatus, such as the processing circuitry or the like, is configured to construct the group box to have the grouping type associated with burst-captured images, such as a grouping type of "brst" in the embodiment of FIG. 3. In this example embodiment, the apparatus, such as the processing circuitry, the memory 14 or the like, is configured to cause storage of the respective image identifiers of the image items that were captured in a burst in the group box in a capture-wise temporal order, such as in a capture-wise temporally increasing or decreasing order. Thus, the image identifiers of the plurality of image items are arranged in an order defined by the order in which the images were captured, such as from the initially captured image in a sequentially increasing manner to the final captured image or from the final captured image in a sequentially decreasing manner to the initially captured image. In the example of FIG. 3, the group box of the illustrated embodiment includes the image identifiers of the image items, namely, {1, 2, 3, . . . , N} in a set termed entity ids with the order of the image identifiers in the set indicating the temporal order of the respective image items. In the example of FIG. 1, the group box also includes a group identifier that uniquely identifies the group box within the image container file. Although various types of identifiers for the group box may be utilized, numerical identifiers may be utilized and, in the illustrated embodiment, the group box has a group identifier of 1. Although the image container file of FIG. 3 includes image items of a single burst and, as a result, a single group box, the image container file may include image items of two or more bursts as well as a plurality of group boxes, each of which is associated with a different one of the bursts. Still further, the image items of a single burst may be divided into subsets and stored in two or more group boxes, such as by storing the odd-numbered image items in one group box and the even-numbered image items in another group box.

In an embodiment in which the image items are time-synchronized images, the apparatus 10, such as the processing circuitry 12, the communication interface 16 or the like, is configured to receive the plurality of image items that were synchronously captured by the plurality of image capture devices. As shown in the example of FIG. 4, the resulting image container file 30 is constructed so as to include a plurality of image items (image item id=1, image item id=2 and image item id=3) captured by a first image capture device and a plurality of image items (image item id=4, image item id=5 and image item id=6) captured at the same time by a second image capture device. In an embodiment in which three or more image capture devices synchronistically capture images, the image container file may include additional image items captured by the additional image capture devices. In this example embodiment, the apparatus, such as the processing circuitry, is configured to construct the group box so as to have the grouping type associated with time-synchronized images captured synchronously by the plurality of image capture devices. With respect to the example of FIG. 4, the group box 32 is constructed so as to include a grouping type of "tsyn", which is associated with and designates a group of time-synchronized images captured by a plurality of image capture devices. In this example embodiment, the apparatus, such as the processing circuitry, the memory 14 or the like, is configured to cause storage in the group box of respective image identifiers of the plurality of image items that were captured by one of the image capture devices in time-synchronization with the capture of images by one or more other image capture devices. In the example embodiment of FIG. 4, a first group box identified by group_id of 1 includes the image identifiers for the image items captured by a first image capture device, that is, image identifiers 1, 2 and 3, while a second group box designated by a group_id of 2 includes the image identifiers of the image items captured by a second image capture device, that is, image identifiers 4, 5 and 6. As such, the resulting image container file effectively groups the different time-synchronized images that were captured synchronously by the plurality of different image capture devices based upon the image capture device that captured the image items.

In an alternative embodiment, the time-synchronized image items may be stored in respective media tracks rather than as individual image items and the media tracks may, in turn, be stored in an mdat box of the image container file 30 as shown, for example, in FIG. 5. In the HEIF context, the media tracks may be called image sequence tracks. As before, a group box 32 is constructed with the media tracks being grouped in the group box, such as a TrackGroupBox, which is present in the metadata of each track and, as shown in FIG. 5, may, in turn, be included with a Track box (trak) 34 in one example embodiment. The construction of the group box includes the construction of a grouping type associated with the time-synchronized images, such as a grouping type of 'tstg' which indicates a media track including a group of time-synchronized images in the illustrated embodiment. In this example embodiment, the group box may also identify the media track with which the group box is associated, such as by including a track_group_id. As shown in FIG. 5, the tracks which belong to the same time synchronization track group, that is, tracks comprised of image items captured in time synchronization, have the same {'tstg', track_group_id} listed in their respective 'trgr' boxes in their respective 'trak' boxes.

In an embodiment in which the image item is associated with an audio track, the apparatus 10 also includes means, such as the processing circuitry 12, the communication interface 16 or the like, for receiving an audio track associated with the respective image item. The audio track is designated by a respective track identifier that is unique for the audio tracks stored by the image container file. With reference to FIG. 6, the image container file 30 includes two different audio tracks designated by track identifiers of track_id=10 and track_id=11 along with image items having image identifiers of id=1 and id=2. The image item having the image identifier of 1 is associated with the audio track having the track identifier of 10, while the image item having the image identifier of 2 is associated with the audio track having the track identifier of 11. Audio or visual data, such as the audio tracks of FIG. 6, may be stored in the mdat box of the image container file, and the metadata related to the audio or visual data may be stored in various other boxes such as, but not limited to the trak box, mdia box, etc. as defined in the ISOBMFF specification. In this example embodiment, the apparatus, such as the processing circuitry or the like, is configured to construct the group box to have the grouping type that is associated with an image item associated with an audio track. In the embodiment of FIG. 6, the group box 32 includes a grouping type of "iaug", which designates an image item having an associated audio track. In this example embodiment, the apparatus, such as the processing circuitry, the memory 14 or the like, is also configured to cause storage of the respective image identifier of the respective image item and the respective track identifier of the audio track associated with the respective image item. In the example of FIG. 6, a first group box having a group_id of 1 is constructed that includes the image identifier of 1 and the track identifier of 10 so as to associate the image item having the image identifier of 1 and the audio track having the track identifier of 10. Likewise, the image container file of FIG. 6 includes a second group box designated by a group_id of 2 that includes the image identifier 2 and the track identifier 11 in order to associate the image item having an image identifier of 2 and the audio track having the track identifier of 11. Although the image container file of FIG. 6 includes a single audio track associated with a single image item, the image container file may include two or more audio tracks, each having a different respective track identifier, associated with the same image item, such as in an instance in which the two or more audio tracks represent different channels or spatial properties of the same audio scene associated with the image item.

Following construction, the image container file may be stored, transmitted or other actions may be taken with respect to the image container file. Thereafter, the image container file may be processed so as to render the image items, such as to present the images, replay a video or the like. As such, the operations associated with the processing of an image container file and the rendering of the one or more image items contained by the image container file are depicted in conjunction with FIG. 7. Although reference with respect to the apparatus configured to perform the operations of FIG. 7 is made below relative to the apparatus 10 of FIG. 1, the apparatus for performing the operations of FIG. 7 may be the same apparatus or a different apparatus, that is, embodied by a different computing device than that which constructs the image container file as described above in conjunction with FIG. 2. However, the apparatus configured to perform of the operations of FIG. 6 may include the user interface 18 as referenced below.

As shown in block 40 of FIG. 76, the apparatus 10 includes means, such as the processing circuitry 12, the communications interface 16 or the like, for receiving one or more image container files. The image container file may be received from a database or other memory device with which the apparatus is in communication or from another device that transmits the image container file to the apparatus via the communications interface. As described above, at least one image container file that is received includes a plurality of image items and one or more group boxes as well as zero, one or more media tracks, e.g., audio/visual/image sequence track(s), etc.

As shown in block 42 of FIG. 76, the apparatus 10 includes means, such as the processing circuitry 12 or the like, for identifying a grouping type of a respective group box within a respective image container file. As described above, the grouping type of an example embodiment is associated with one of burst-captured images, time-synchronized images captured synchronously by a plurality of image capture devices or an image item associated with an audio track.

As shown in block 44 of FIG. 7, the apparatus 10 also includes means, such as the processing circuitry 12 or the like, for identifying respective image identifiers of one or more image items in the respective group box. As described above, the image identifiers uniquely identify the image items contained by the image container file that constitute the group that is the subject of the respective group box.

Once the grouping type has been identified and the one or more image items that constitute the group have been identified by their respective image identifiers, the apparatus 10 of an example embodiment includes means, such as the processing circuitry 12, the user interface 18 or the like, for causing the one or image items designated by the respective image identifiers included in the respective group box to be rendered in accordance with the grouping type that has been identified. In this regard, the plurality of image items that are identified in a group box having a grouping type associated with burst-captured images are rendered as a burst of images. As another example, the plurality of image items that are identified in a group box having a grouping time associated with time-synchronized images may subsequently be efficiently rendered such that the images captured by a respective image capture device are sequentially presented. Further, the plurality of image items that are identified in a group box having a grouping time associated with an image item associated with an audio track may be rendered such that the image item is presented concurrent with the playback of the audio track. As such, the method, apparatus and computer program product of an example embodiment permit related items, such as a group of image items or an image item and an associated audio track, to be grouped together and to subsequently be efficiently rendered in a manner consistent with their grouping.

In an embodiment in which the image container file includes burst-captured images, such as shown in FIG. 3, the apparatus 10, such as the processing circuitry 12, is configured to identify the grouping type of the respective group box to be the grouping type associated with burst-captured images. In this example embodiment, the apparatus, such as the processing circuitry, is configured to identify respective image identifiers of one or more image items in the respective group box in a capture-wise temporal order, such as a capture-wise temporally increasing order or a capture-wise temporally decreasing order. In this example embodiment, the apparatus, such as the processing circuitry, the user interface 18 or the like, is configured to cause the one or more image items to be rendered by causing the plurality of image items designated by the respective image identifiers identified in the respective group box to be rendered as a burst of images in the capture-wise temporal order in which the image identifiers are arranged.

In another example embodiment depicted in FIG. 4 in which the image container file includes a plurality of time-synchronized images captured by two or more image capture devices, the apparatus 10, such as the processing circuitry 12 is configured to identify the grouping type for the respective group box by identifying the grouping type to be associated with time-synchronized images captured by the plurality of image capture devices. In this example embodiment, the apparatus, such as the processing circuitry, is also configured to identify respective image identifiers of one or more image items in the respective group box by identifying respective image identifiers of the plurality of image items in the respective group box that were captured by one of the image capture devices in time-synchronization with the capture of images by one or more other image capture devices. In this example embodiment, the apparatus, such as the processing circuitry, the user interface 18 or the like, is configured to cause the one or more image items to be rendered by causing the plurality of image items that were captured by one of the image capture devices in time-synchronization with the capture of images by one or more other image capture devices and that are designated by the respective image identifiers identified in the respective group box to be rendered. Thus, the image items captured by a single image capture device may be presented in a temporally increasing or temporally decreasing order as defined by the order of the image identifiers.

In another embodiment relating to time-synchronized images depicted to FIG. 5, the apparatus 10, such as the processing circuitry 12, is configured to identify the grouping type of the group box by identifying the grouping type to be associated with a media track including the time-synchronized images captured by a respective image capture device and having a respective track identifier. The apparatus of this example embodiment, such as the processing circuitry, is also configured to identify respective image identifiers of one or more image items in the group box by identifying the respective track identifier of the media track with which the grouping type is associated. The apparatus of this example embodiment, such as the processing circuitry, is further configured to cause the one or more image items to be rendered by causing the media track designated by the respective track identifier to be rendered so as to cause the plurality of image items that were captured by the respective image capture device to be correspondingly rendered.

In an embodiment depicted in FIG. 6 in which the image container file includes an image item and an associated audio track, the apparatus 10 includes means, such as the processing circuitry 12 or the like, for identifying a respective track identifier of an audio track in the respective group box. In this example embodiment, the apparatus, such as the processing circuitry, the user interface 18 or the like, is configured to cause the one or more image items to be rendered by causing the image item designated by the respective image identifier identified by the respective group box to be rendered in association with the audio track designated by the respective track identifier identified in the respective group box. Thus, the image may be presented and the associated audio track may be played back during the presentation of the image, such as during an audiovisual presentation.

As described above, the method, apparatus 10 and computer program product of an example embodiment define and utilize a grouping type in a group box of an image container file in order to facilitate the storage, transmission and subsequent rendering of burst-captured images, time-synchronized images and/or images associated with audio tracks. As such, the method, apparatus and computer program product may provide a consistent viewer experience as well as interoperability. Although the method, apparatus and computer program product may be utilized in conjunction with a variety of differently formatted images, the method, apparatus and computer program product of an example embodiment advantageously permit the additional features provided by the HEIF to support additional use cases relating to burst-captured images, time-synchronized images and an image item associated with an audio track.

As described above, FIGS. 2 and 7 are flowcharts of an apparatus 10, method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by processing circuitry 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 2 and 7. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving a plurality of image items, each image item designated based on a respective image identifier;
   constructing a group box within an image container file, the image container file being an ISOBMFF (International Standards Organization Base Media File Format) and/or HEIF (High Efficiency Image File) compliant file, wherein the group box is able to contain groups of multiple grouping types selected from burst-captured images, time-synchronized images captured by a plurality of image capture devices, or an image item associated with an audio track, wherein the constructed group box has at least one grouping type indicated as being selected from one or more of the burst-captured images, the time-synchronized images captured by the plurality of image capture devices, or the image item associated with the audio track; and
   causing storage of the respective image identifier of at least one of the plurality of image items in the group box.

2. A method according to claim 1, wherein receiving the plurality of image items comprises receiving a plurality of image items that were captured in a burst, wherein constructing the group box comprises constructing the group box to have a grouping type associated with the burst-captured images, and wherein causing storage of the respective image identifier comprises causing storage of the respective image identifier for each of the plurality of image items that were captured in a burst in a capture-wise temporal order.

3. A method according to claim 1, further comprising transmitting the image container file including the group box and the stored respective image identifier of at least one of the plurality of image items in the group box.

4. An apparatus comprising:
   at least one processor; and
   at least one memory storing instructions that, when executed by the at least one processor, cause the apparatus at least to perform:
   receiving a plurality of image items, each image item designated based on a respective image identifier;
   constructing a group box within an image container file, the image container file being an ISOBMFF (International Standards Organization Base Media File Format) and/or HEIF (High Efficiency Image File) compliant file, wherein the group box is able to contain groups of multiple grouping types selected from burst-captured images, time-synchronized images captured by a plurality of image capture devices, or an image item associated with an audio track, wherein the constructed group box has at least one grouping type indicated as being selected from one or more of the burst-captured images, the time-synchronized images captured by the plurality of image capture devices, or the image item associated with the audio track; and
   causing storage of the respective image identifier at least one of the plurality of image items in the group box.

5. An apparatus according to claim 4, wherein the at least one memory further stores instructions that, when executed by the at least one processor, causes the apparatus at least to perform: transmitting the image container file including the group box and the stored respective image identifier of at least one of the plurality of image items in the group box.

6. An apparatus according to claim 4, wherein the at least one memory further stores instructions that, when executed by the at least one processor, causes the apparatus at least to perform:
   receiving the plurality of image items based on receiving a plurality of image items that were captured in a burst;
   constructing the group box by constructing the group box to have a grouping type associated with the burst-captured images; and
   causing storage of a respective image identifier by causing storage of the respective image identifier for each of the plurality of image items that were captured in a burst in a capture-wise temporal order.

7. An apparatus according to claim 6, wherein the capture-wise temporal order is a capture-wise temporally increasing or decreasing order.

8. An apparatus according to claim 4, wherein:
   receiving the plurality of image items comprises receiving a plurality of image items that were synchronously captured by the plurality of image capture devices;
   constructing the group box comprises constructing the group box to have a grouping type associated with time-synchronized images captured by the plurality of image capture devices; and
   causing storage of respective image identifiers comprises causing storage of respective image identifiers of the plurality of image items that were captured by one of the image capture devices in time synchronization with capture of images by at least one other image capture devices.

9. An apparatus according to claim 4, wherein:
   receiving the plurality of image items comprises receiving a plurality of image items that were synchronously captured by the plurality of image capture devices with the image items captured by a respective image capture device forming a media track having a respective track identifier;
   constructing the group box comprises constructing the group box to have a grouping type associated with the media track including the time-synchronized images captured by the respective image capture device; and
   causing storage of respective image identifier comprises causing storage of the respective track identifier of the media track including the time-synchronized images captured by the respective image capture device in time synchronization with capture of images by one or more other image capture devices.

10. An apparatus according to claim 4, wherein the at least one memory further stores instructions that, when executed by the at least one processor, causes the apparatus at least to perform:
    receiving an audio track associated with a respective image item and designated by a respective track identifier;
    constructing the group box by constructing the group box to have a grouping type associated with the respective image item associated with the audio track; and
    causing storage of respective image identifiers by causing storage of the respective image identifier of the respective image item and the respective track identifier of the audio track associated with the respective image item.

11. A method comprising:
    receiving at least one image container file, wherein at least one image container file includes a plurality of image items and at least one group box, the image container file being an ISOBMFF (International Standards Organization Base Media File Format) and/or HEIF (High Efficiency Image File) compliant file;

identifying a grouping type of a group box within a respective image container file, wherein the group box is able to contain groups of multiple grouping types selected from burst-captured images, time-synchronized images captured by a plurality of image capture devices, or an image item associated with an audio track, wherein the grouping type is indicated as being selected from one or more of the burst-captured images, the time-synchronized images captured by the plurality of image capture devices or the image item associated with an audio track;

identifying a respective image identifier of at least one image item in the group box using a corresponding group type; and causing the at least one image item designated by the respective image identifier identified in the group box to be rendered in accordance with the grouping type that has been identified.

12. An apparatus comprising:
at least one processor; and
at least one memory storing instructions that, when executed by the at least one processor, cause the apparatus at least to perform:
receiving at least one image container file, wherein at least one image container file includes a plurality of image items and at least one group boxes, the image container file being an ISOBMFF (International Standards Organization Base Media File Format) and/or HEIF (High Efficiency Image File) compliant file;
identifying a grouping type of a group box within a respective image container file, wherein the group box is able to contain groups of multiple grouping types selected from burst-captured images, time-synchronized images captured by a plurality of image capture devices, or an image item associated with an audio track, wherein the grouping type is indicated as being selected from one or more of the burst-captured images, the time-synchronized images captured by the plurality of image capture devices, or the image item associated with the audio track;
identifying a respective image identifier of at least one image item in the group box using a corresponding group type; and
causing the at least one image item designated by the respective image identifier identified in the group box to be rendered in accordance with the grouping type that has been identified.

13. An apparatus according to claim 12, wherein:
identifying the grouping type of the group box comprises identifying the grouping type to be associated with the burst-captured images;
identifying the respective image identifier of the at least one image item in the group box comprises identifying respective image identifiers of a plurality of image items in the group box in a capture-wise temporal order using corresponding group types; and
causing the at least one image item to be rendered comprises causing the plurality of image items designated by the respective image identifiers identified in the group box to be rendered as a burst of images in the capture-wise temporal order.

14. An apparatus according to claim 13, wherein the capture-wise temporal order is a capture-wise temporally increasing or decreasing order.

15. An apparatus according to claim 12 wherein the at least one image container file further includes at least one audio track, wherein the at least one memory further stores instructions that, when executed by the at least one processor, causes the apparatus at least to perform:
identifying a respective track identifier of an audio track in the group box; and
causing the at least one image item to be rendered by having causing the at least one image item designated by the respective image identifier identified in the group box to be rendered and the audio track designated by the respective track identifier identified in the group box to be played back during rendering of the at least one image item.

16. An apparatus according to claim 12, wherein:
identifying the grouping type of the group box comprises identifying the grouping type to be associated with time-synchronized images captured by the plurality of image capture devices;
identifying a respective image identifiers of at least one image item in the group box comprises identifying respective image identifiers of a plurality of image items in the group box that were captured by one of the image capture devices in time synchronization with capture of images by at least one other image capture devices; and
causing the at least one image item to be rendered comprises causing the plurality of image items that were captured by one of the image capture devices in time synchronization with the capture of the images by at least one other image capture device and that are designated by the respective image identifiers identified in the group box to be rendered.

17. An apparatus according to claim 12, wherein:
identifying the grouping type of the group box comprises identifying the grouping type to be associated with a media track including the time-synchronized images captured by a respective image capture device and having a respective track identifier;
identifying a respective image of at least one image item in the group box comprises identifying the respective track identifier of the media track with which the grouping type is associated; and
causing the at least one image items to be rendered comprises causing the media track designated by the respective track identifier to be rendered so as to cause the plurality of image items that were captured by the respective image capture device to be correspondingly rendered.

* * * * *